(12) United States Patent
Chen et al.

(10) Patent No.: US 9,019,964 B2
(45) Date of Patent: Apr. 28, 2015

(54) METHODS AND SYSTEMS FOR ROUTING APPLICATION TRAFFIC

(75) Inventors: Zhen Chen, Thornton, CO (US); Delvan Ard, Brighton, CO (US); James Lee Lorimer, III, Broomfield, CO (US); Matthew Knox, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 118 days.

(21) Appl. No.: 13/450,749

(22) Filed: Apr. 19, 2012

(65) Prior Publication Data

US 2013/0279506 A1   Oct. 24, 2013

(51) Int. Cl.
*H04L 12/28* (2006.01)
*H04L 12/54* (2013.01)
*H04L 12/24* (2006.01)
*H04L 29/12* (2006.01)

(52) U.S. Cl.
CPC .............. *H04L 41/042* (2013.01); *H04L 12/56* (2013.01); *H04L 41/0695* (2013.01); *H04L 61/2539* (2013.01)

(58) Field of Classification Search
USPC .......................................................... 370/392
See application file for complete search history.

(56) References Cited

U.S. PATENT DOCUMENTS

| 7,209,551 | B1 | 4/2007 | Schroeder et al. |
| 7,570,586 | B1 * | 8/2009 | Albert et al. .................. 370/229 |
| 2006/0155862 | A1 * | 7/2006 | Kathi et al. .................... 709/229 |

* cited by examiner

*Primary Examiner* — Yemane Mesfin
*Assistant Examiner* — Jeff Banthrongsack
(74) *Attorney, Agent, or Firm* — Sheridan Ross P.C.

(57) ABSTRACT

Methods and systems for routing application traffic to an operable system manager are provided. In particular, an arbiter application is provided to identify a currently active system manager. The arbiter application provides an address for the active system manager to a routing node. Applications send communications to the active system manager by associating such communications with a virtual system manager address. Such communications are delivered to the routing node, which associates the actual address for the currently active system manager with the communication. The communications are then delivered to the active system manager using the actual address.

20 Claims, 3 Drawing Sheets

METHODS AND SYSTEMS FOR ROUTING APPLICATION TRAFFIC

FIELD

Systems and methods for routing application traffic are provided. More particularly, methods and systems for routing traffic between a selected management server and managed applications are provided.

BACKGROUND

In various communication and computer systems, redundancy of components is desirable, in order to maintain system functionality. For example, multiple redundant management servers may be provided to ensure the provision of features to client applications. Typically, each of the servers in a redundant system are associated with different Internet protocol or other addresses. Therefore, when a switch is made from one system manager to another, redundant system manager, for example due to a failure of the first system manager, the applications within the system that require communications with a system manager must be directed to the second, replacement system manager.

In previous systems, each application must detect the management server change, and then switch over to the new management server. This includes reconfiguring the individual applications to communicate with the replacement management server. As a result, individual applications must include this functionality, in order to adapt to a change in management servers.

An alternative practice is to provide a load balancer in front of the redundant system managers. In such a configuration, the load balancer detects the switch to the redundant management server and routes traffic addressed to the original system server to the replacement system server. However, this solution requires the addition of a load balancing server on the server side of the system, which increases the complexity and cost of the system.

Still other systems incorporate virtual server addresses. In such systems, when a switch is made to a replacement server, the replacement server assumes the virtual IP address of the original server. In particular, the virtual address is reassigned from the original server to the active, replacement server. However, this approach increases complexity on the server side.

SUMMARY

In accordance with embodiments of the present disclosure, methods and systems are provided that enable a system to switch between redundant system managers, management servers, or other management devices, without requiring applications that communicate with an active system manager to be aware of the change. More particularly, embodiments of the present disclosure provide a client side application that implements a change in the address used for communications from applications on the client side of the system. Moreover, this can be performed for all applications on the client side of the system. In addition, a switch between redundant system managers can be made, without the switch being apparent to the applications.

In accordance with embodiments of the present disclosure, an arbiter application is provided as part of a client system or device. The arbiter application operates to ensure that communications from client side applications are directed to the currently active system manager. More particularly, client applications can use a virtual Internet protocol or other address to communicate with a system manager. The virtual IP address is then replaced with the IP or other address of the operational system manager. Accordingly, the client side applications are unaware of the actual address of the operational system manager. When an operational system manager shuts down, dies or otherwise becomes unavailable, the arbiter can operate to detect the change to a second, redundant system manager, and replace the IP address of the original management server with the IP address of the replacement system manager. In accordance with at least some embodiments, the arbiter application operates in conjunction with a domain network address translation (DNAT) or routing module. In such embodiments, the virtual address used by the client side applications directs packets to the DNAT module. The DNAT module then reroutes the outgoing packets to the IP address of the operational management server. The operational management server address is provided to the DNAT module by the arbiter. Accordingly, the DNAT module functions as a routing node.

Methods in accordance with embodiments of the present disclosure include providing multiple, redundant system managers. Communications from client applications to a system manager are addressed to a virtual IP or other address. A routing node receives the packets thus addressed, and associates an IP or other address of the operational system manager with the packets. The routing node operates at the direction of an arbiter application. The arbiter application provides the IP address of the operational system manager to the routing node. When a change from a first system manager to a second system manager is implemented, for example due to the first system manager becoming unavailable, the arbiter application provides the routing node with the address of the replacement system manager. The routing node then uses the address of the replacement system manager to send outgoing packets from client side applications to the replacement system manager.

Additional features and advantages of embodiments of the present disclosure will become more readily apparent from the following description, particularly when taken together with the accompanying drawings.

DETAILED DESCRIPTION

Figure 1:
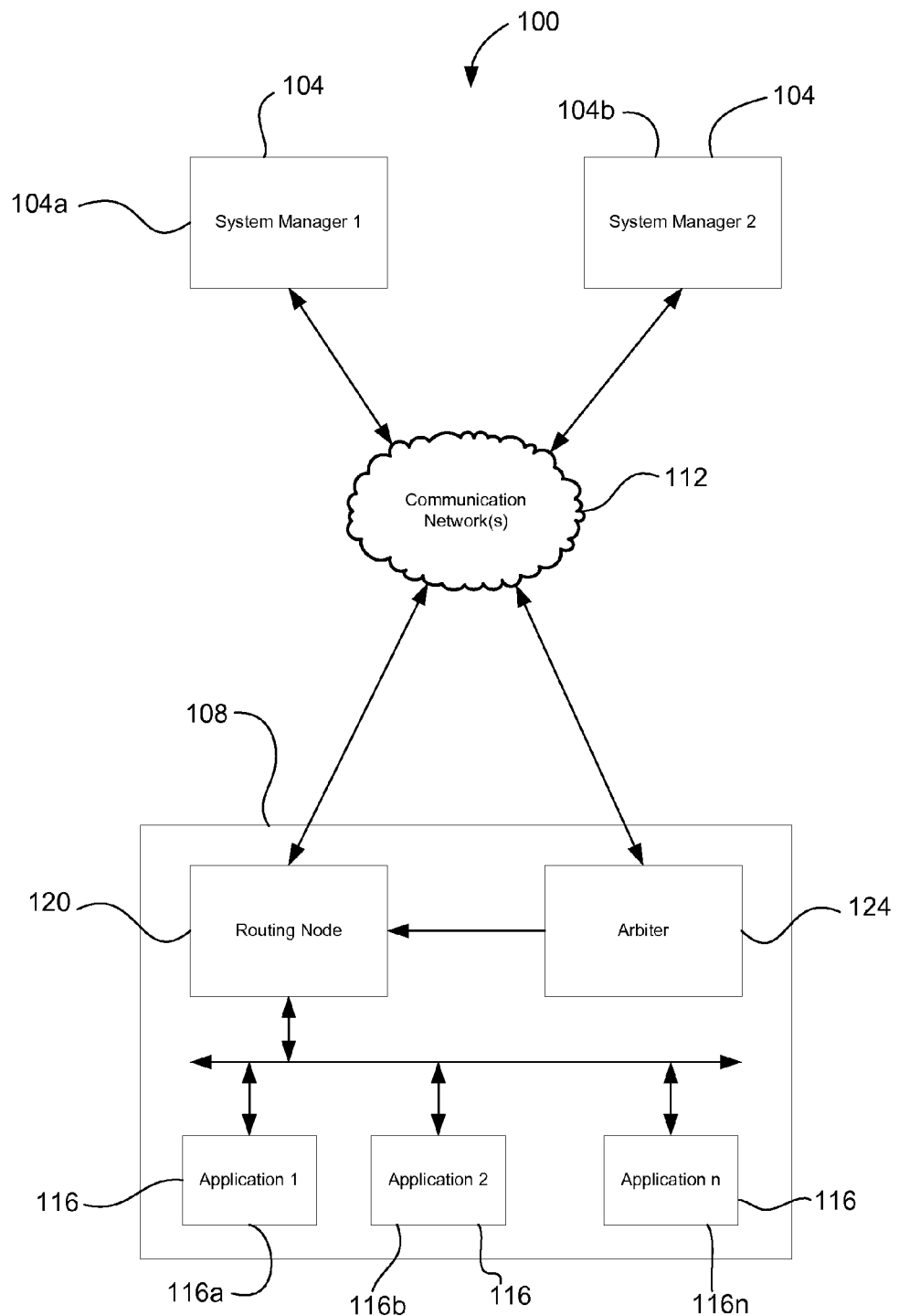
FIG. 1 illustrates components of a system in accordance with embodiments of the present disclosure.

FIG. 1 illustrates an exemplary system 100. The system 100 includes a plurality of system managers or management devices 104. In this example system 100 first 104a and second 104b system managers are illustrated. Moreover, a system 100 can have more than two system managers 104. In general, the system managers 104 comprise redundant nodes. The system managers 104 are in communication with a client system or device 108 via one or more communication networks 112. As an example, but without limitation, the communication network 112 may comprise an Internet protocol (IP) or packet data network. The client system 108 generally includes a plurality of client applications 116. Communications between the client applications 116 and an operational system manager 104 can be passed through a routing node 120. The routing node 120 may comprise a domain network address translation (DNAT) module. An arbiter application or module (hereinafter also referred to herein as simply the arbiter) 124, also running on the client system 108, controls the operation of the routing node 120. More particularly, as described in greater detail elsewhere herein, the arbiter 124 provides the routing node 120 with the address of the operational system manager 104 that is used in connection with data packets sent from a client application 116 to a system manager 104.

In normal operation, a single system manager 104 (e.g., system manager 1 104*a*) is actively engaged in communications with client applications 116. The other system manager 104 (e.g., system manager 2 104*b*) is maintained in a standby mode. Accordingly, the operational system manager 104 can periodically provide updated data or other information to the system manager 104 operating in a standby mode. The system managers 104 are typically implemented on separate server devices, in order to provide redundancy of operation. Moreover, the system managers 104 can be geo-redundant (i.e., placed in different geographic locations). Accordingly, if the active system manager 104 becomes unavailable, for example through failure of that system manager 104 itself or through the failure of a communication link to that system manager 104, the redundant system manager 104 can be moved from a standby mode to an active mode. Accordingly, uninterrupted provision of services to the client applications 116 is achieved even in the event of a failure related to the primary or originally active system manager 104.

In accordance with embodiments of the present disclosure, the arbiter application 124 operates to detect the change from the previous active management server 104 to the replacement management server 104. In addition, the arbiter application 124 directs the routing node 120 to substitute the address of the replacement management server 104 (e.g., the second management server 104*b*) for the address of the previously active management server 104 (e.g., the first management server 104*a*). Accordingly, alternate routing of communications from client applications 116 to the currently active management server 104 is effected. Moreover, this alternate routing is achieved without requiring that the client applications 116 have an awareness that the active management server 104 has changed.

Figure 2:
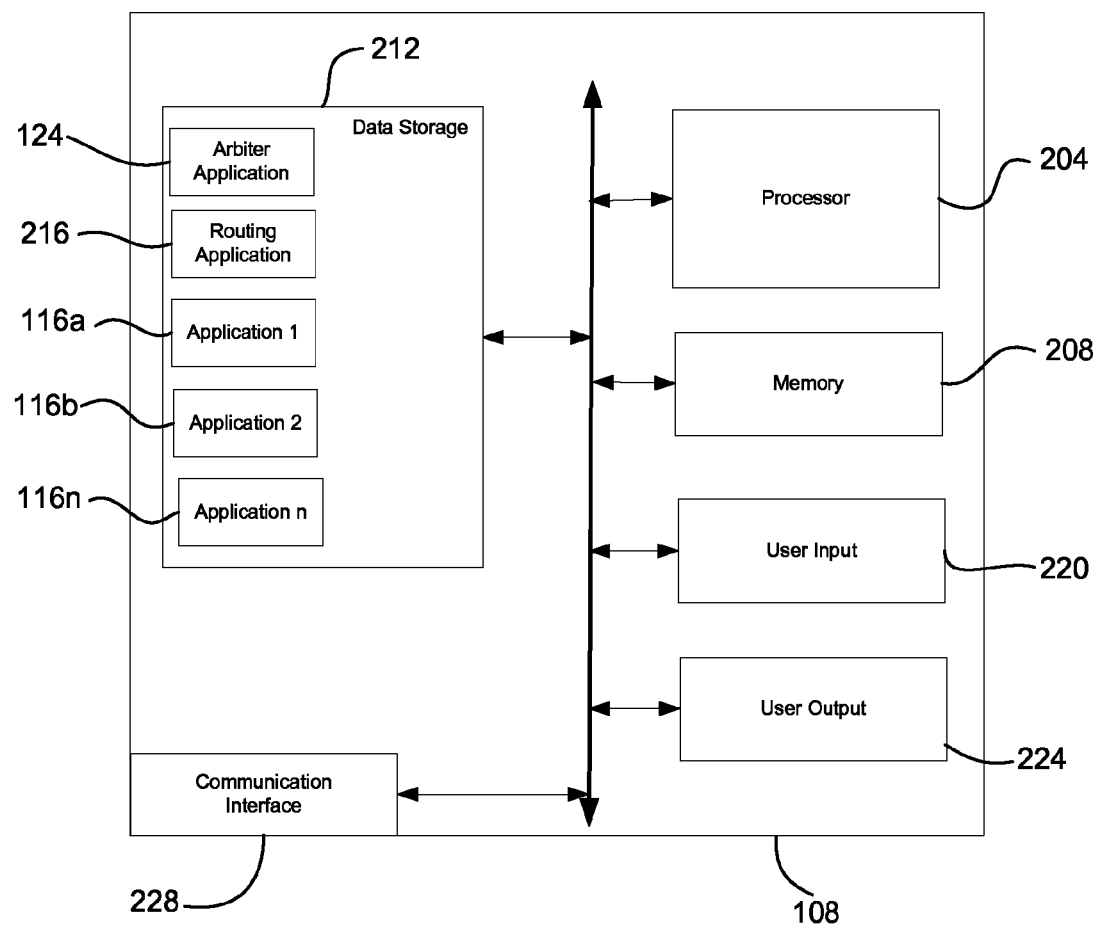
FIG. 2 illustrates components of an exemplary client system in accordance with embodiments of the present disclosure.

FIG. 2 illustrates components of an exemplary client system or device 108. In general, the client system 108 can comprise a general purpose computer or server device running various client applications 116, or that operates in association with client applications 116 executed by separate but associated devices. Accordingly, the client system 108 can include a processor 204. The processor 204 may comprise a general purpose programmable processor or controller for executing application programming or instructions. As a further example, the processor 204 may comprise a specially configured application specific integrated circuit (ASIC) or other integrated circuit, a digital signal processor, hardwired electronic or logic circuit such as a discrete element circuit, a programmable logic device or gate array, special purpose computer, or the like. The processor 204 generally functions to run programming code or instructions implementing various functions of the client device.

A client system 108 may also include memory 208 for use in connection with the execution of application programming by the processor 204, and for the temporary or long term storage of program instructions and/or data. As examples, the memory 208 may comprise RAM, SDRAM or other solid state memory. Alternatively or in addition, data storage 212 may be provided. In accordance with embodiments of the present disclosure, data storage 212 can contain programming code or instructions implementing various of the applications or functions executed or performed by the client device 108. Like the memory 208, the data storage 212 may comprise a solid state memory device or devices. Alternatively or in addition, the data storage 212 may comprise a hard disk drive or other random access memory.

As examples, the data storage 212 can include storage for the various client applications 116 executed by or in association with the client device 108. As examples, the data storage 212 can include the arbiter application 124, and a routing application 216 for implementing the routing node 120. In addition, various applications 116 that require or benefit from communications with a system manager 104 are included. Examples of applications 116 include different applications 116 for performing various functions, and/or different instances of particular applications 116, for example running in connection with different users. More particularly, when an application 116 initiates a communication with a system manager 104, such communications may be in the form of data packets that are associated with a virtual address, such as but not limited to a virtual Internet protocol (IP) address. As described in greater detail elsewhere herein, the communication associated with the virtual address is received at the routing application 216, which then substitutes the address for the currently active system manager 104 for the virtual address originally associated with the communication. The address of the currently active system manager 104 can be provided to the routing application 216 by the arbiter application 124. As shown, the various applications 124, 216, 116 can be implemented on a single client system or device 108 processor 204 in association with memory 208 and/or data storage 212 included in that device 108. In accordance with other embodiments, a client system 108 can be distributed across multiple discrete devices, which can each include one or more processors 204. For example, different applications 116 may be executed by different client devices included in the client system 108. In addition, the arbiter 124 and/or routing node 120 can be implemented in connection with an arbiter application 124 and a routing application 216 executed by a device separate from the device or devices on which applications 116 are executed. In accordance with still other embodiments, the routing node 120 can be implemented by or on a device included in the client system 108 that is different than a device also included in the client system 108 that executes the arbiter application 124.

The client system or device 108 can additionally include a user input 220 and a user output 224. Such devices 220 and 224 can be used in connection with the use of and interface with an application 116 by a user of the client system 108. Examples of user input devices 220 include a keyboard, a numeric keypad, a touch screen, microphone, scanner, and pointing device combined with a screen or other position encoder. Examples of user output devices 224 include a display, a touch screen display, a speaker, and a printer. As can be appreciated by one of skill in the art, a touch screen display may comprise a combined user input 220 and user output 224 or device. In addition, a client system 108 can be associated with a communication interface 228. In general, the communication interface 228 can physically interconnect the client system 108 to an active system manager 104 through a communication network 112. Accordingly, examples of a communication interface 228 include a network interface card, a wired Ethernet interface, or a wireless Wi-Fi interface.

Figure 3:
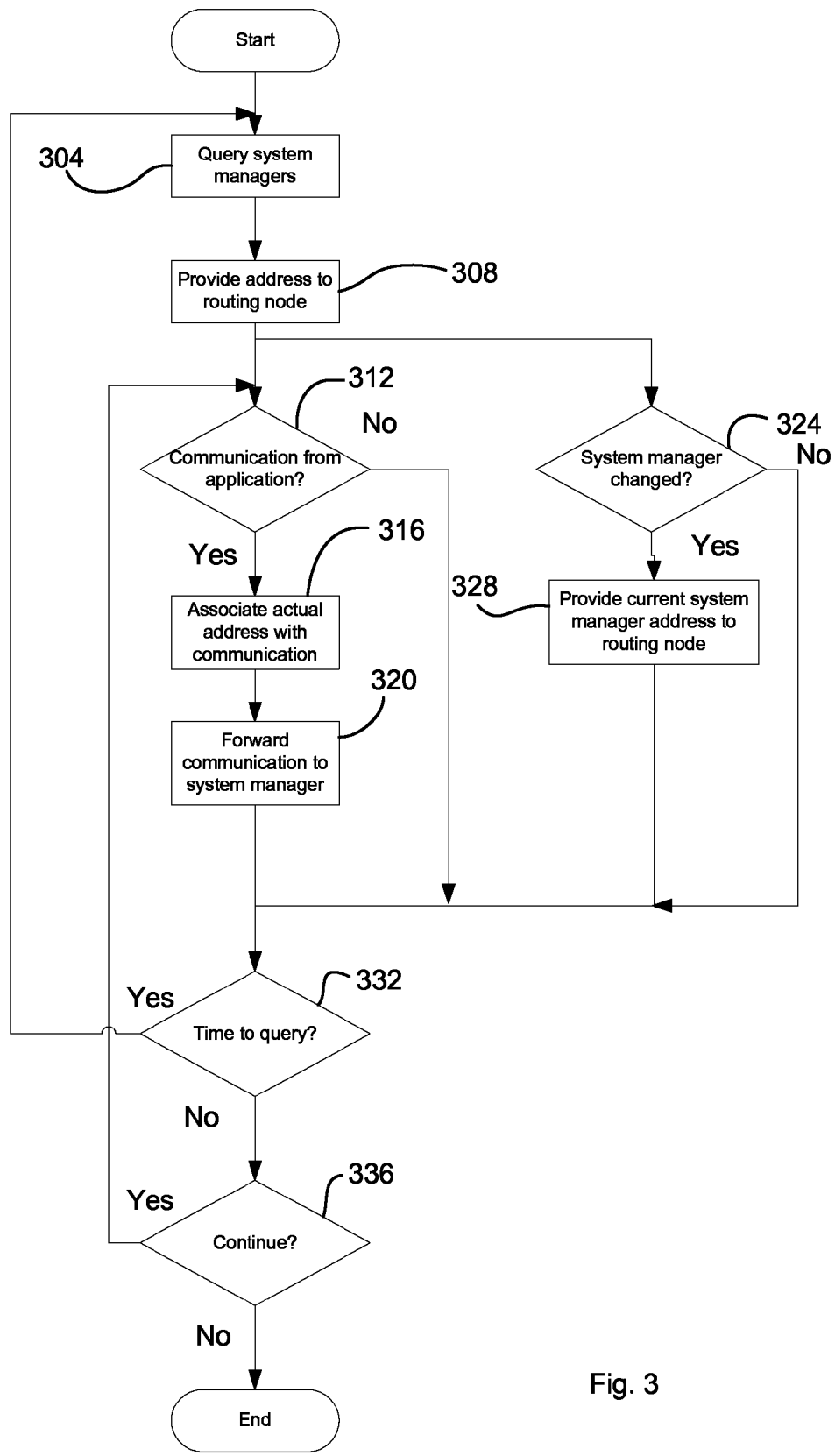
FIG. 3 illustrates aspects of a method for routing application traffic to a management server in accordance with embodiments of the present disclosure.

With reference now to FIG. 3, aspects of the operation of a system 100 providing multiple redundant system managers 104 in accordance with embodiments of the present disclosure are illustrated. Initially, at step 304, the client system 108 can query one or more of the system managers 104 to verify or determine the address of the currently active system manager 104. The status query can also obtain the address for one or more alternate system managers 104 that are currently in a standby mode. This query can be performed by the arbiter application 124 associated with the client system 108. At step 308, the address obtained for the currently active system manager 104 as a result of the query is provided to the routing node 120 (step 308). At step 312, a determination is made as to whether a communication from an application 116 that is associated with a virtual address, such as a virtual Internet protocol (IP) address that is used by applications 116 running in or in connection with the client system 108 to communicate with the active system manager 104 is received at the routing node 120. In normal operation, the virtual IP address used by applications 116 of a client system 108 does not change, even when the identity, and therefore the actual address, of the active system manager 104 changes. The routing node 120 then associates the actual address for the active system manager 104 with the communication received from the application 116 (step 316). For example, the routing node 120 can replace the virtual IP address provided with the communication received from the application 116 with the actual address of the active system manager 104. The routing node 120 then forwards the communication across the network 112 to the active system manager 104 (step 320).

At step 324, in parallel with step 312, a determination can be made as to whether a signal or other communication has been received by the arbiter application 124, indicating that the identity of the active system manager 104 has changed. If the arbiter application 124 has received a signal indicating that the identity of the active system manager 104 has changed, the arbiter application 124 in turn signals the routing node 120 to use the actual address for the replacement system manager 104 as the delivery address for communications received from applications 116 with the virtual address used to identify communications intended for a system manager 104. This includes the arbiter application 124 providing the routing node 120 with the actual address for the replacement system manager 104 (step 328). The actual address for the replacement system manager 104 can be an address communicated to the arbiter application 124 by a system manager 104, including but not limited to the newly activated system manager 104, as part of the signal indicating that the previously active system manager 104 has been replaced by a different system manager 104. Alternatively or in addition, the actual address of the replacement system manager 104 can be stored in memory on the client system 108, for example in association with the arbiter application 124, and implemented as soon as an indication that the previously active system manager 104 is no longer operable has been received. Moreover, the signal indicating to the arbiter application 124 that the previously active system manager 104 is no longer available can be inferred. For example, if the arbiter application 124 does not receive a response to a query sent to a system manager 104 requesting the status of that system manager 104, the arbiter 124 can direct the routing node 120 to utilize the actual address of an alternate system manager 104.

At step 332, a determination can be made as to whether a time for querying one or more system managers 104 for status information has been reached. If it is time to send a status query, the process can return to step 304. Accordingly, status queries can be implemented by, for example the arbiter application 124, periodically. Alternatively or in addition, a status query can be triggered by activity occurring on or in connection with the client system 108. For example, a status query can be performed in response to manual input from an administrator or other user, after configuration changes with respect to the client system 108 and/or one or more system managers 104, or after a change in any other parameter associated with operation of the system 100. If it is not time to implement a status query, a determination can be made as to whether operation of the system 100 in connection with routing application traffic should continue (step 336). If operation is to continue, the process can return to step 304. Alternatively, the process may end.

As described herein, various components of a system 100 can be implemented as one or more software modules or applications, running on one or more processors associated with computing devices. Moreover, the various devices, including but not limited to system mangers 104 and a device or devices included in a client system 108 can be implemented in connection with general purpose computers and/or nodes. Moreover, the various components can be interconnected by a communication or computer network 112. Moreover, the communication network 112 can generally support the delivery of data packets using address information associated with such packets.

In various exemplary implementations, systems and methods for routing application traffic can be usefully employed in connection with communication solutions. Moreover, embodiments of the present disclosure can be applied where the use of redundant, including but not limited to geo-redundant, management servers is desirable, in order to better ensure the provision of services to a client system or systems 108. Moreover, as can be appreciated by one of skill in the art after consideration of the present disclosure, embodiments of systems and methods described herein do not require individual applications 116 to be aware of changes in the identity of a management server 104, or to implement changes to the address used for communications intended for a system manager 104 when the identity of the active system manager 104 changes. Instead, such changes are implemented by client side components on behalf of the applications 116. Although these client side components, including the routing node 120 and the arbiter application 124 have been described as separate components, they can be integrated with one another. Moreover, though generally described as operating on a unitary device included in the client system 108, the routing node 120, arbiter application 124, and other applications 116 can be executed by different devices (e.g., on different processors 204).

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for routing application traffic, comprising:
   sending a first message from a first client-side application stored on a memory to a first client-side routing node;
   routing, by the first client-side routing node, the first message to a first system manager using a first address associated with the first system manager;
   providing by a first client-side arbiter stored on a memory a second address associated with a second system manager to the first client-side routing node;
   sending a second message from the first client-side application to the first client-side routing node;
   querying at least one of the first and second system managers by the first client-side arbiter, wherein the determination by the first client-side arbiter that the second system manager has replaced the first system manager is made in response to a result of querying the at least one of the first and second system managers; and
   routing, by the first client-side routing node, the second message to the second system manager using the second address.

2. The method of claim 1, wherein the second address associated with the second system manager is provided to the first client-side routing node by the first client-side arbiter in response to a determination by the first client-side arbiter that the second system manager has replaced the first system manager.

3. The method of claim 1, wherein the result of querying the at least one of the first and second system managers is a signal from the second system manager that the first system manager has been replaced.

4. The method of claim 1, wherein the result of querying the at least one of the first and second system managers includes a failure to receive a response to the querying from the first system manager.

5. The method of claim 2, further comprising:
   prior to sending the first message from the first client-side application to the first client-side routing node, providing by the first client-side arbiter the first address associated with the first system manager to the first client-side routing node.

6. The method of claim 5, further comprising:
   prior to providing by the first client-side arbiter the second address associated with the second management server to the client-side first routing node, sending a third message from a second client-side application to the first client-side routing node, and routing, by the first client-side routing node, the third message to the first system manager using the first address.

7. The method of claim 5, further comprising:
   after providing by the first client-side arbiter the second address associated with the second management server to the first client-side routing node, sending a third message from a second client-side application to the first client-side routing node, and routing, by the first client-side routing node, the third message to the second system manager using the second address.

8. The method of claim 7, wherein the first message from the first client-side application to the first client-side routing node is addressed to a first virtual address, wherein the second message from the first client-side application to the first client-side node is addressed to the first virtual address, and wherein the third message from the second client-side application to the first client-side routing node is addressed to the first virtual address.

9. The method of claim 1, wherein the first client-side application, the first client-side routing node and the first client-side arbiter are dispose within a client system.

10. A non-transitory computer readable medium having stored thereon computer executable instructions, the computer readable instructions causing a processor to execute a method for facilitating routing communications to one of a plurality of system managers in a system, the computer readable instructions comprising:
    instructions to receive communications from any one of a plurality of client-side applications included in a client system at a client-side routing node included in the client system, wherein the client-side routing node is associated with a first virtual address;
    instructions to, in the client-side routing node, associate at least a first communication from a first client-side application with an address of a first system manager of the plurality of system managers;
    instructions to, in the client-side routing node, query at least one of the plurality of system managers, wherein the determination that a second system manager of the plurality of system managers has replaced the first system manager is made in response to a result of querying one of the first and second system managers;
    instructions to, in the client-side routing node, utilize an address of the second system manager of the plurality of system managers; and
    instructions to, in the client-side routing node and after receiving the instructions to utilize the address of the second system manager, associate at least a second communication from the first client-side application and a first communication from a second client-side application with the address of the second system manager of the plurality of system managers.

11. The non-transitory computer readable medium of claim 10, further comprising:
    instructions to forward the first communication from the first client-side application received prior to implementation of the instructions to utilize an address of the second system manager to the first system manager.

12. The non-transitory computer readable medium of claim 11, further comprising:
    instructions to forward the second communication from the first client-side application received after implementation of the instructions to utilize an address of the second system manager to the second system manager.

13. The non-transitory computer readable medium of claim 11, further comprising:
    instructions to forward the first communication from the second client-side application received after implementation of the instructions to utilize an address of the second system manager to the second system manager.

14. The non-transitory computer readable medium of claim 10, further comprising:
    instructions to determine an active system manager from the plurality of system managers.

15. The non-transitory computer readable medium of claim 14, further comprising:
    in response to determining that the active system manager has changed to the second system manager, instructing the routing node to utilize the address of the second system manager.

16. A system, comprising:

at least a first processor; and a memory, wherein the memory has stored thereon:

a first client-side application;

a client-side arbiter application, wherein the client-side arbiter application is operable to query at least one system manager from among a plurality of system managers, wherein the query results in a determination by the client-side arbiter that at least one of the plurality of system managers has replaced at least one of another system manager of the plurality of system managers and wherein the client-side arbiter application is operable to determine an active system manager from among a plurality of system managers; and a client-side routing application, wherein the client-side routing application is operable to receive data packets from the first client-side application addressed to a first virtual address associated with the client-side routing application, and wherein the first client-side routing application is further operable to associate the data packets from the first client-side application with an actual address of the active system manager.

17. The system of claim 16, further comprising:

a communication interface, wherein the data packets from the first client-side application are transmitted to the active system manager through a communication network interconnected to the communication interface.

18. The system of claim 17, wherein in response to determining that a system manager previously on standby is the active system manager, changing the actual address associated with data packets received at the client-side routing application with the actual address of the system manager previously on standby.

19. The system of claim 18, wherein the active system manager is implemented on a server device interconnected to the first processor by the communication network.

20. The system of claim 16, wherein the first virtual address associated with the client-side routing application is provided to the client-side routing application by the client-side arbiter application in response to a determination by the client-side arbiter application that the at least one of the system managers has replaced the at least one of another system managers.

\* \* \* \* \*

UNITED STATES PATENT AND TRADEMARK OFFICE
CERTIFICATE OF CORRECTION

| | | |
|---|---|---|
| PATENT NO. | : 9,019,964 B2 | Page 1 of 1 |
| APPLICATION NO. | : 13/450749 | |
| DATED | : April 28, 2015 | |
| INVENTOR(S) | : Zhen Chen et al. | |

It is certified that error appears in the above-identified patent and that said Letters Patent is hereby corrected as shown below:

In the Claims

At Column 7, line 64, after "ent-side" insert --routing-- therein.

Signed and Sealed this
Fifteenth Day of September, 2015

Michelle K. Lee
*Director of the United States Patent and Trademark Office*